United States Patent [19]

Ellermann

[11] 4,346,646
[45] Aug. 31, 1982

[54] PISTON FOR INTERNAL COMBUSTION ENGINES

[75] Inventor: Jürgen Ellermann, Schwaikheim, Fed. Rep. of Germany

[73] Assignee: Mahle GmbH, Stuttgart, Fed. Rep. of Germany

[21] Appl. No.: 170,622

[22] Filed: Jul. 21, 1980

Related U.S. Application Data

[63] Continuation of Ser. No. 956,156, Oct. 31, 1978, abandoned.

[30] Foreign Application Priority Data

Dec. 28, 1977 [DE] Fed. Rep. of Germany ....... 2758378

[51] Int. Cl.³ ............................ F02F 3/02; F16J 1/00
[52] U.S. Cl. ........................................ 92/220; 92/216; 92/224; 123/193 P
[58] Field of Search ................ 92/220, 221, 216, 224; 123/193 P

[56] References Cited

U.S. PATENT DOCUMENTS

| | | | |
|---|---|---|---|
| 2,159,402 | 5/1939 | Retschy | 92/220 |
| 2,806,750 | 9/1957 | Gehres | 92/220 X |
| 3,385,175 | 5/1968 | Meier et al. | 92/220 X |
| 3,465,651 | 9/1969 | Tromel | 92/220 X |
| 3,520,234 | 7/1970 | Hill et al. | 92/220 |

FOREIGN PATENT DOCUMENTS 643385  9/1950  United Kingdom ................. 92/220

Primary Examiner—Irwin C. Cohen
Attorney, Agent, or Firm—Murray and Whisenhunt

[57] ABSTRACT

Piston for internal combustion engines having a piston body consisting of light metal and a crown plate consisting of a metal of lower thermal conductivity which is secured axially to the piston body by means of necked-down screws and centered radially in relation to the piston body by means of an annular fit, and in which the outer ring of the fit is formed by the crown plate in the region of the sliding surface and the inner ring of the fit is formed by the piston body, in which at room temperature a gap widening in the direction towards the piston foot is provided between the annular surfaces of crown plate and piston body meeting in the annular fit, in such a way that the annular surfaces lie firmly against one another only at their ends pointing towards the piston head, and that this gap is reduced at working temperature.

3 Claims, 1 Drawing Figure

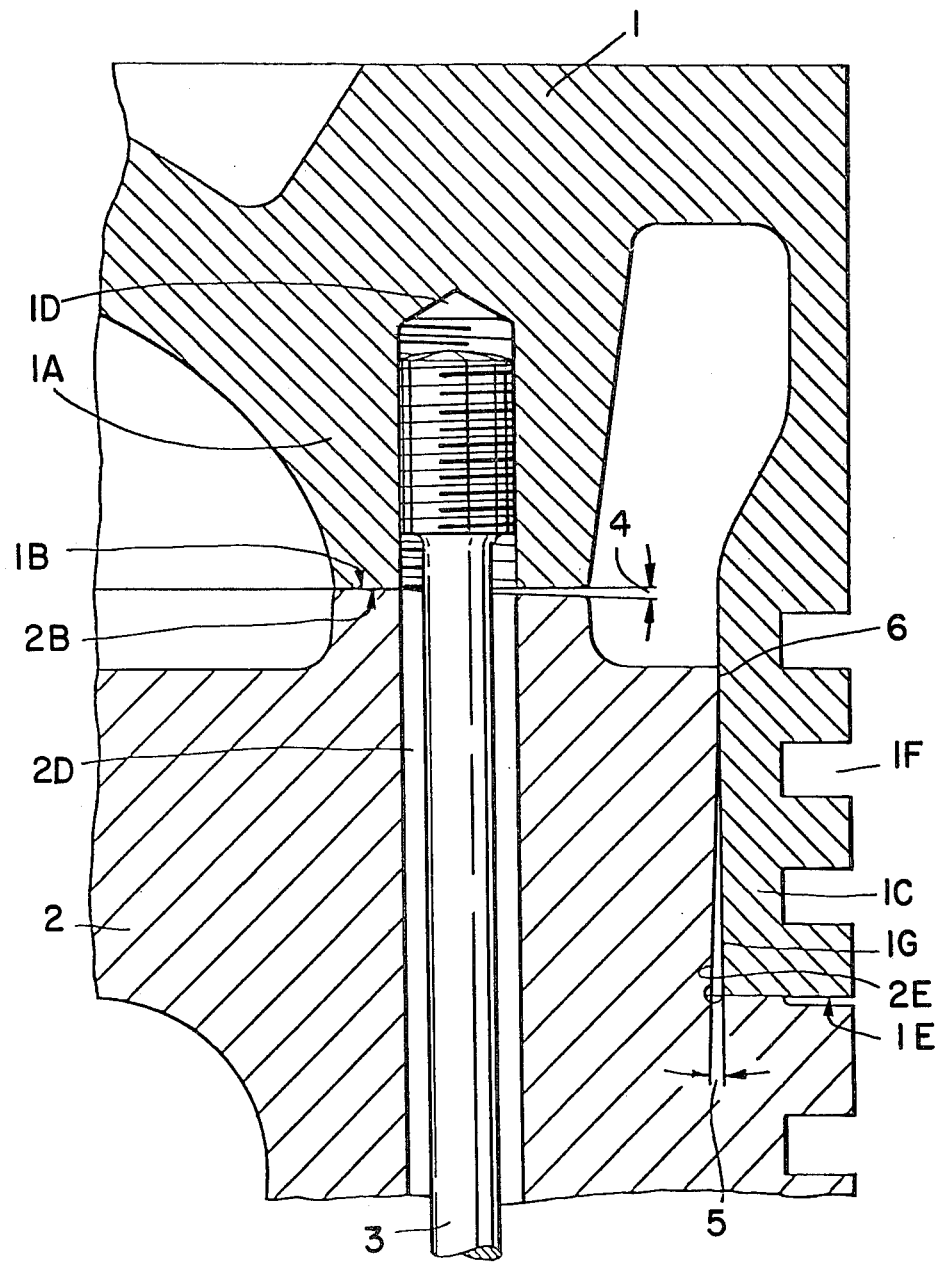

PISTON FOR INTERNAL COMBUSTION ENGINES

This is a continuation application of Ser. No. 956,156, filed Oct. 31, 1978, now abandoned.

BACKGROUND OF THE INVENTION

1. Field of the Invention

The invention relates to a piston for internal combustion engines, particularly pistons having crown plates.

2. Description of the Prior Art

When such pistons are heated to working temperature, the crown domes upwards around the axial retaining screws. For the protection of the axially extending necked-down screws against bending stresses which easily lead to breakage, by reason of the doming of the crown, it was already proposed in German Publ. Spec. No. 12 69 414 to provide a radially outwardly widening gap between the abutment surfaces of piston crown and piston body which are braced against one another by the necked-down screws. The effect of this gap in relation to the screw loading is described in detail in Ger. Pub. Sp. No. 12 69 414.

Now the upward doming of the piston crown influences not only the abutment faces connected with one another by the necked-down screws, but also the radial annular fit between piston crown and piston body, serving for the centring of the two parts. As a result of the upward doming of the piston crown the annular surface of the piston crown also seeks to place itself obliquely in the annular fit between crown and piston body. Thus the zone of the annular fit lying towards the piston foot is more heavily loaded than the zone of the annular fit pointing towards the piston head. The oblique position can proceed so far that an annulr gap widening towards the piston head develops in the annular fit at working temperature. The unequal abutment of the two surfaces of piston crown and piston body which meet in the annular fit leads, as shown by practice, to the development of friction rust especially in the zone of the annular fit facing towards the piston foot.

This is explained in that micro-displacements occur between the adjoining surfaces in the annular fit under pressure which is elevated in comparison with room temperature specifically in the zone towards the piston foot. More especially the elevated pressure in the lower fit zone appears to determine the development of the occurring friction rust. It is however also possible that the micro-displacements are rendered possible only by the gap formation at working temperature in the annular fit.

SUMMARY OF THE INVENTION

It is the problem of the invention to avoid the friction rust formation in the region of the annular fit in pistons of the classification in question.

BRIEF DESCRIPTION OF THE DRAWINGS

The drawing shows a fragmentary cross-section of a piston according to the invention.

DESCRIPTION OF THE PREFERRED EMBODIMENTS

A crown 1 of steel is connected with a piston body 2 of aluminium by means of necked-down screws 3. The piston is illustrated at room temperature. In this condition the axially mutually adjoining abutment surfaces between crown and piston body possess an outwardly widening gap 4. In the radial direction crown and piston body are centred by an annular fit having a gap 5 widening towards the piston foot. The angle for the gap 5 is to be selected so that the surfaces of piston crown and piston body lie on one another at working temperature. In the case of a piston having a diameter of 400 mm. and an annular fit with an axial height of 27.5 mm., the angle for the gap lies approximately between 3 and 25 minutes of angle, that is to say the maximum gap width lies between about 0.03 and 0.2 mm.

The crown 1 has an inwardly projecting circular rib 1A which has an inner seating surface 1B. The crown 1 also has an annular skirt 1C which is spaced in the axial direction away from the rib and contains a plurality of piston-ring grooves 1F. The body has an abutment surface 2B engaged by said seating surface 1B. The rib 1A has a plurality of tapped bores 1D therein engaged by the screw-threaded heads of screws 3. The body has bores 2D in alignment with the bores 1D to receive the stems of the screws 3. The body has an exterior surface 2E which, when the piston is at atmospheric temperature, is engaged by the interior surface 1G of the skirt only in the region 6 of the skirt adjacent to the crown.

I claim:

1. A piston suitable for an internal combustion engine, comprising:
   (a) a piston body (2) of light metal, having an abutment surface (2B) and an exterior, radially facing surface (2E) with an upper outer annular edge;
   (b) a piston crown (1) of metal having a lower thermal conductivity than said light metal, said piston crown including:
      (i) an inwardly projecting rib (1A) having an inner seating surface (1B), said abutment surface (2B) being abuttingly engaged to said inner seating surface to provide an abutting engagement, said abutting engagement being the sole engagement of said rib with said piston body, said rib having therein a plurality of tapped bores (1D), said piston body (2) having therein bores (2D) in alignment with said tapped bores (1D) in said rib;
      (ii) screws (3) having screw-threaded heads engaged in said tapped bores (1D); and
      (iii) an annular skirt (1C) having a free end (1E), said free end (1E) engaging a radially directed surface of said piston body, said annular skirt being axially spaced from said rib (1A); and
   (c) means for substantially preventing creation of frictional rust between said annular skirt (1C) and said piston body (2), said means being comprised of an interior surface (1G) of said annular skirt abuttingly engaged, when said piston is at ambient non-working temperature, with said exterior, radially facing surface (2E) of said piston body only in the region (6) of said annular skirt which is adjacent to the upper outer annular edge of the piston body, said exterior, radially facing surface (2E) being spaced from said interior surface (1G) by a gradually increasing radial distance towards said free end (1E) of said annular skirt, said radial distance being reduced upon increase in working temperature of said piston to bring about complete radial surface contact between said inner surface (1G) and said exterior, radially facing surface (2E), whereby micro movements between said exterior, radially facing surface (2E) and said interior surface (1G) are substantially prevented with consequent elimination of formation of frictional rust between said interior surface (1G) and said exterior, radially facing surface (2E).

2. A piston according to claim 1, wherein when said piston is at ambient non-working temperature, said inner seating surface (1B) is abuttingly engaged to said abutment surface (2B) only in a region adjacent one of said screws (3), said inner seating surface and said abutment surface being spaced from each other by a gradually increasing axial distance to form a divergent gap (4), said divergent gap being reduced upon increase in working temperature of said piston to reduce stress in said screws (3).

3. A piston suitable for an internal combustion engine, comprising:
   (a) a piston body (2) of light metal having an abutment surface (2B) and an exterior, radially facing surface (2E) with an upper outer annular edge;
   (b) a piston crown (1) of metal having a lower thermal conductivity than said light metal, said piston crown including:
      (i) an inwardly projecting rib (1A) having an inner seating surface (1B), said abutment surface (2B) being abuttingly engaged to said inner seating surface to provide an abutting engagement, said abutting engagement being the sole engagement of said rib with said piston body, said rib having therein a plurality of tapped bores (1D), said piston body (2) having therein bores (2D) in alignment with said tapped bores (1D) in said rib;
      (ii) screws (3) having screw-threaded heads engaged in said tapped bores (1D); and
      (iii) an annular skirt (1C) having a free end (1E), said free end (1E) engaging a radially directed surface of said body, said annular skirt being axially spaced from said rib (1A); and
   (c) means for substantially preventing frictional rust between said annular skirt (1C) and said piston body (2), said means being comprised of an interior surface (1G) of said annular skirt abuttingly engaged, when said piston is at ambient non-working temperature, with said exterior, radially facing surface (2E) of said piston body only in the region (6) of said annular skirt which is adjacent to the upper outer annular edge of the piston body, said annular skirt having at least two piston grooves (1F) extending over the length of the skirt from said region (6) to said free end (1E), said exterior, radially facing surface (2E) being spaced from said interior surface (1G) by a gradually increasing radial distance towards said free end (1E) of said annular skirt, said radial distance being reduced upon increase in working temperature of said piston to bring about complete radial surface contact between said inner surface (1G) and said exterior, radially facing surface (2E), whereby micro movements between said exterior, radially facing surface (2E) and said interior surface (1G) are substantially prevented with consequent elimination of formation of frictional rust between said interior surface (1G) and said exterior, radially facing surface (2E).

* * * * *